(12) United States Patent
Park

(10) Patent No.: US 11,572,126 B2
(45) Date of Patent: Feb. 7, 2023

(54) SHOCK ABSORBER STRUCTURE AND MOBILITY DEVICE INCLUDING SAME

(71) Applicants: Hyundai Motor Company, Seoul (KR); Kia Motors Corporation, Seoul (KR)

(72) Inventor: Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 408 days.

(21) Appl. No.: 16/843,526

(22) Filed: Apr. 8, 2020

(65) Prior Publication Data

US 2021/0031866 A1    Feb. 4, 2021

(30) Foreign Application Priority Data

Aug. 2, 2019    (KR) .................. 10-2019-0094544

(51) Int. Cl.
| | |
|---|---|
| *B62K 25/08* | (2006.01) |
| *B62K 21/12* | (2006.01) |
| *B62K 21/02* | (2006.01) |
| *B62K 3/00* | (2006.01) |

(52) U.S. Cl.
CPC .............. *B62K 25/08* (2013.01); *B62K 3/002* (2013.01); *B62K 21/02* (2013.01); *B62K 21/12* (2013.01)

(58) Field of Classification Search
CPC ........ B62K 25/08; B62K 3/002; B62K 21/02; B62K 21/12
See application file for complete search history.

(56) References Cited

U.S. PATENT DOCUMENTS

| | | | | |
|---|---|---|---|---|
| 6,604,751 | B2 * | 8/2003 | Fox ...................... | B62K 25/04 280/276 |
| 9,174,692 | B2 * | 11/2015 | Treadway ............. | B62K 5/027 |
| 2005/0189185 | A1 * | 9/2005 | Turner .................. | F16F 9/54 188/282.4 |

FOREIGN PATENT DOCUMENTS

KR    10-1995-7002918    8/1995

* cited by examiner

*Primary Examiner* — Bryan A Evans
(74) *Attorney, Agent, or Firm* — Fox Rothschild LLP; Peter F. Corless

(57) ABSTRACT

A shock absorber includes a stationary part; a steering part extending in a longitudinal direction and rotatably coupled to the stationary part by a rotation axis in the longitudinal direction; a sliding part which forms an internal space containing fluid between the steering part and slidably coupled to the steering part in a direction in which the steering part extends; an elastic body having both ends respectively coupled to the steering part and the sliding part to support the steering part and the sliding part and maintain the internal space between the steering part and the sliding part; a flow path formed in the sliding part and configured to communicate the internal space between the steering part and the sliding part to outside so that the fluid can flow; and a steered driving wheel slidably connected to the sliding part.

13 Claims, 5 Drawing Sheets

SHOCK ABSORBER STRUCTURE AND MOBILITY DEVICE INCLUDING SAME

CROSS REFERENCE TO RELATED APPLICATION

The present application claims under 35 U.S.C. § 119(a) the benefit of Korean Patent Application No. 10-2019-0094544, filed Aug. 2, 2019, the entire contents of which are incorporated by reference herein.

BACKGROUND

(a) Technical Field

The present disclosure relates to a shock absorber structure and a mobility device including the same, more particularly, to the shock absorber structure of the mobility device in which a damper using internal fluid can be provided.

(b) Description of the Related Art

In recent years, due to increasing demand for mobility devices and the problem of environmental pollution, development of a single-person transportation device referred to as a personal mobility device has progressed.

As an example of the personal mobility device, a transportation device referred to as a kickboard is widely used. The configuration of the kickboard includes a deck part provided with wheels and a handle part provided with a handle.

Conventional personal mobility devices typically have a telescopic type suspension structure that includes one or two springs, or a link type suspension structure that transfers load by extending a plurality of links.

However, the telescopic type suspension structure has a problem in that removal of residual vibration is difficult with no damper, and the link type suspension structure has a problem with a complicated structure and hence an increased load. Also, because of exposed wiring outside, both of the above suspension types have a problem of degraded durability, and at the same time, poor aesthetics.

The above matters described as the related art are intended merely to aid in the understanding of the background of the present disclosure and should not be taken as acknowledging that the present disclosure falls within the purview of the related art that is already known to those skilled in the art.

SUMMARY

The present disclosure provides a shock absorber structure and a mobility device including the same in which damping of contraction action and expansion action is separately controllable and a damper capable of damping the actions is included.

In order to achieve the above objective, according to one aspect of the present disclosure, there is provided a shock absorber structure, the structure including: a stationary part; a steering part extending in a longitudinal direction and rotatably coupled to the stationary part by a rotation axis in the longitudinal direction; a sliding part which forms an internal space containing fluid between the steering part and the sliding part and is slidably coupled to the steering part in a direction in which the steering part extends; an elastic body having both ends that are respectively coupled to the steering part and the sliding part to support the steering part and the sliding part and maintain the internal space between the steering part and the sliding part; a flow path formed in the sliding part and configured to communicate the internal space between the steering part and the sliding part with an outside so that the fluid can flow; and a steered driving wheel rotatably connected to the sliding part.

In addition, the stationary part may surround a part of the steering part from the outside, and may be coupled to the steering part through a bearing positioned between the steering part and the steering part.

In addition, the steering part may penetrate the stationary part, and be integrally connected to the steering wheel so as to rotate with the steering wheel.

In addition, the shock absorber structure may further include a wire configured to be inserted into an inside of the steering part from the steering wheel and extended to simultaneously penetrate both the stationary part surrounding an outside of the steering part and the steering part.

In addition, the steering part may have an inwardly indented space, and the sliding part in a state in which a part of the sliding part is inserted into an inside of the steering part may be coupled to the steering part so as to be slidable with each other.

In addition, the shock absorber structure may further include a sealing member fixed to an end of the steering part so as to seal a gap between an inner circumference surface of the steering part and an outer circumference surface of the sliding part.

In addition, an insertion protrusion may be provided at an end of the steering part, and an insertion groove extending along a sliding direction of the sliding part may be provided on an outer circumference surface of the sliding part so that the sliding part slides in a state where the insertion protrusion is inserted into the insertion groove, in order to prevent a relative rotation between the steering part and the sliding part.

In addition, a hollow shaft may be provided by forming a guide shaft protruding toward the internal space in a central portion in one of the steering part and the sliding part, and by forming a guide hole protruding toward the internal space and sliding with the guide shaft inserted thereinto in the central portion in a remaining one of the steering part and the sliding part.

In addition, the shock absorber structure may further include a stopper preventing sliding between the steering part and the sliding part, the stopper being positioned at an end of the hollow shaft or a position corresponding to the end of the guide shaft in the steering part, or at the end of the guide shaft or a position corresponding to the end of the hollow shaft in the sliding part.

In addition, the flow path may include a first flow path allowing a flow of the fluid discharged to the outside from the internal space between the steering part and the sliding part; and a second flow path allowing a flow of the fluid from the outside into the internal space between the steering part and the sliding part.

In addition, a check valve may be provided in the flow path to allow the fluid to flow in only one direction.

In addition, an outlet of the flow path may be configured to have an orifice structure.

In addition, the shock absorber structure may further include a control part coupled to the sliding part to be relatively movable to vary an opening degree of an outlet of the flow path in a position where the outlet is provided.

In another aspect, the present disclosure provides a mobility device having the shock absorber structure, the mobility device including: a steering wheel penetrating the stationary part, and integrally connected to the steering part so as to rotate with the steering part; a deck extending from the stationary part or integrally connected to the stationary part and having an area on which feet of an occupant are placed; and an auxiliary wheel rotatably coupled to the deck part. The shock absorber structure may include: a stationary part; a steering part extending in a longitudinal direction and rotatably coupled to the stationary part by a rotation axis in the longitudinal direction; a sliding part which forms an internal space containing fluid between the steering part and the sliding part and is slidably coupled to the steering part in a direction in which the steering part extends; an elastic body having both ends that are respectively coupled to the steering part and the sliding part to support the steering part and the sliding part and maintain the internal space between the steering part and the sliding part; a flow path formed in the sliding part and configured to communicate the internal space between the steering part and the sliding part with an outside so that the fluid can flow; and a steering wheel rotatably connected to the sliding part.

According to a shock absorber structure and a mobility device including the same of the present disclosure, the damper is implemented only by a simple structure, thereby reducing the residual vibration.

In addition, the damping force of the contraction action and the expansion action of the shock absorber can be controlled separately to improve the riding comfort.

In addition, by inserting the wiring connecting the steering wheel and the deck inside the shock absorber structure, there is an effect that aesthetics and durability are improved.

DETAILED DESCRIPTION OF THE DISCLOSURE

Figure 1:
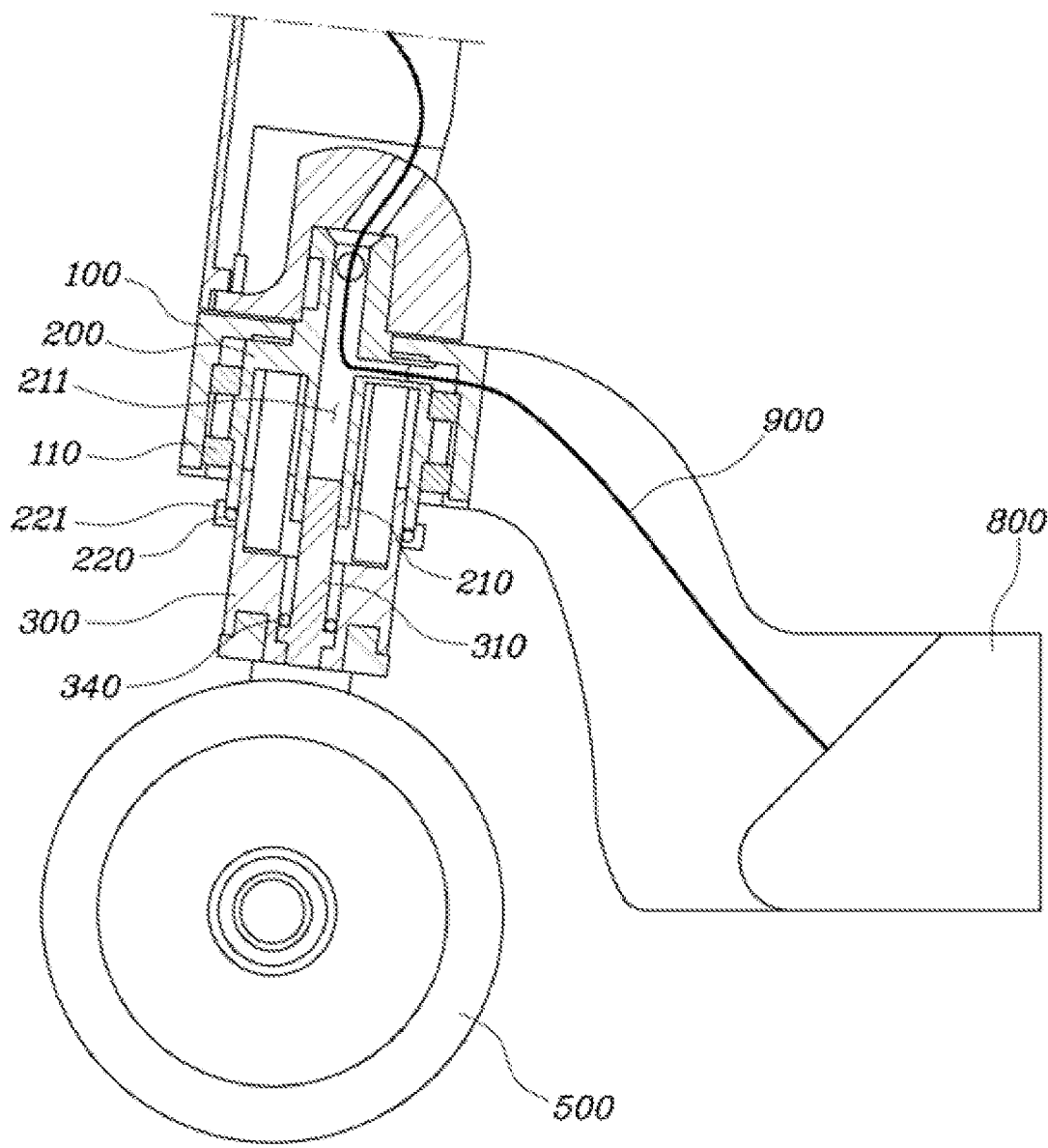
FIGS. 1 and 2 are cross-sectional views of a shock absorber structure according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of the embodiments of the present disclosure disclosed herein are only for illustrative purposes of the embodiments of the present disclosure. The present disclosure may be embodied in many different forms. Therefore, the embodiments of the present disclosure should not be construed as limiting the present disclosure.

Since the embodiments of the present disclosure can be variously modified in many different forms, specific embodiments will be illustrated in the drawings and described in detail in the specification or application of the present disclosure. However, this is not intended to limit the embodiments in accordance with the concept of the present disclosure to a particular disclosed form. On the contrary, the present disclosure is to be understood to include all various alternatives, equivalents, and substitutes that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present disclosure will be described in detail with reference to the accompanying drawings. Throughout the drawings, the same reference numerals will refer to the same or like parts.

Figure 2:
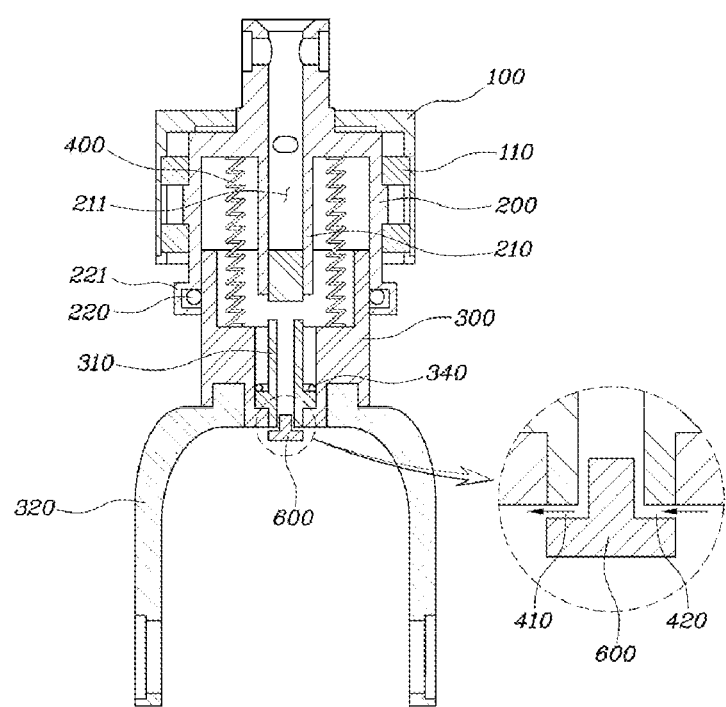
Figure 3:
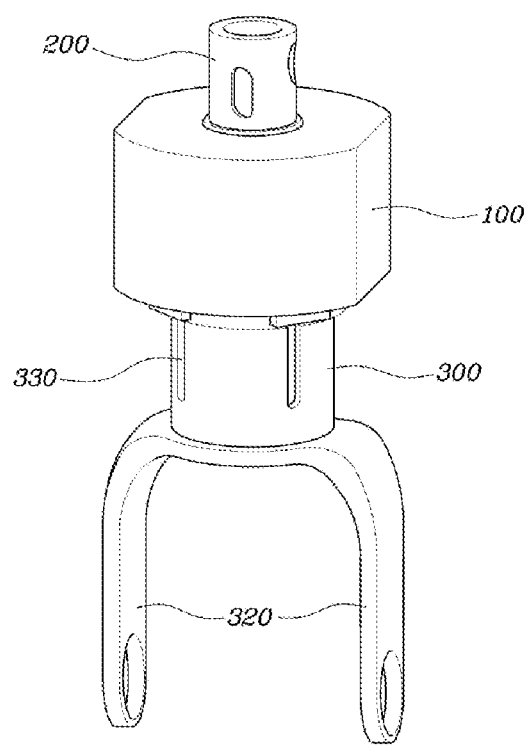
FIGS. 3 and 4 are a perspective view and a cross-sectional view, respectively, of the shock absorber structure according to an exemplary embodiment of the present disclosure.
Figure 4:
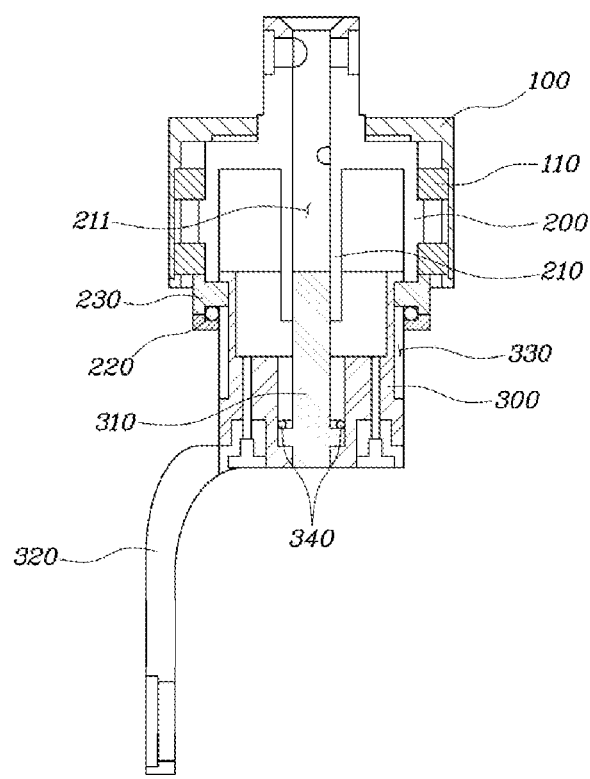

FIGS. 1 to 2 are cross-sectional views of a shock absorber structure according to an exemplary embodiment of the present disclosure, and FIGS. 3 to 4 are a perspective view and a cross-sectional view, respectively, of the shock absorber structure according to an exemplary embodiment of the present disclosure.

Referring to FIGS. 1 to 4, the shock absorber structure according to an exemplary embodiment of the present disclosure includes: a stationary part 100; a steering part 200 extending in a longitudinal direction and rotatably coupled to the stationary part 100 by a rotation axis in the longitudinal direction; a sliding part 300 forming an internal space containing a fluid between the steering part 200 and slidably coupled to the steering part 200 in a direction in which the steering part 200 extends; an elastic body 400 having both ends thereof respectively coupled to the steering part 200 and the sliding part 300 to support the steering part 200 and the sliding part 300 so as to maintain the internal space between the steering part 200 and the sliding part 300; a flow path 410 and a flow path 420 formed in the sliding part 300 to communicate the internal space between the steering part 200 and the sliding part 300 to outside so that a fluid can flow; and a steered driving wheel 500 rotatably connected to the sliding part 300.

The stationary part 100 may be formed to surround a lateral side of the steering part 200 to be described later. In addition, the stationary part 100 may be relatively rotatable independently of the rotation of the steering part 200 and the sliding part 300. In particular, as described below, the stationary part 100 may be integrally connected to a deck part 800 on which the occupant rides.

The steering part 200 may have a shape extending in a vertical direction and may be rotatably coupled to the stationary part 100 in a state in which a lateral side thereof is surrounded by the stationary part 100. The rotation axis of the steering part 200 may be in the vertical direction in which the steering part 200 extends.

The sliding part 300 may be slidably coupled to the steering part 200 along the vertical direction, which is the direction in which the steering part 200 extends. An internal space is formed between the steering part 200 and the sliding part 300, and the internal space may vary in volume by sliding of the sliding part 300.

In particular, in the steering part 200 and the sliding part 300, the interior space thereof may be indented at the planes facing each other, thus the internal space can be further extended.

The internal space may be maintained by the elastic force of an elastic body 400. One end of the elastic body 400 may be coupled to the steering part 200, and the other end may be coupled to the sliding part 300 to apply the elastic force in order to separate the steering part 200 and the sliding part 300. On the contrary, the elastic body 400 may apply the elastic force in a direction in which the steering part 200 and the sliding part 300 are pulled so that the steering part 200 and the sliding part 300 are not separated.

The internal space may be filled with fluid. The fluid may be a compressible fluid or an incompressible fluid, and the fluid may be simply air.

The flow paths 410 and 420 may be formed to communicate the internal space between the sliding part 300 and the steering part 200 to the outside. Each of the flow paths 410 and 420 may enable the fluid to flow in only one direction and may block the flow in the opposite direction In particular, the flow paths 410 and 420 may include both a flow path 420 for introducing the fluid from the outside into the internal space and a flow path 410 for discharging the fluid from the internal space to the outside.

The steering wheel 500 may be connected to the sliding part 300. In particular, the steering wheel 500 may be rotated on the basis of the sliding part 300 by fixing a rotating shaft of the steering wheel 500 to the sliding part 300.

The sliding part 300 may include a fork 320. The fork 320 is formed extending from the sliding part 300, and the rotation axis of the steered driving wheel 500 may be fixed to the fork 320.

Accordingly, the damper of the steered driving wheel 500 may be implemented by the fluid provided in the internal space between the steering part 200 and the sliding part 300, and thus residual vibration may be quickly removed.

The stationary part 100 surrounds a part of the steering part 200 from the outside, and the stationary part 100 and the steering part 200 may be combined through a bearing 110 positioned in between The bearing 110 may be positioned between the outer circumference surface of the steering part 200 and an inner circumference surface of the stationary part 100 so that the steering part 200 and the stationary part 100 are rotatably coupled to each other.

The steering part 200 may penetrate the stationary part 100, and be integrally connected to rotate with the steering wheel 700.

That is, the steering part 200 may be connected through the steering part 200 and the stationary part 100 so as to be rotated by the steering wheel 700 which the occupant steers. The steering part 200 extends upward through the stationary part 100 to be connected to the steering wheel 700. Conversely, it is also possible that the steering wheel 700 is connected to the steering part 200 through the stationary part 100.

A wire 900 configured to be inserted inside of the steering part 200 from the steering wheel 700 and extended to simultaneously penetrate both the stationary part 100 surrounding the outside of the steering part 200 and the steering part 200 may be further included.

In the related art, the wire 900 extending from the steering wheel 700 is exposed to the outside, thus leading to a problem of spoiling the aesthetics, and at the same time, causing the exposed wire 900 to be easily damaged. Here, the wire 900 may be a wire, a power supply line, or a brake line.

According to an exemplary embodiment of the present disclosure, the wire 900 extending from the steering wheel 700 may be inserted into the steering part 200. In particular, the wire 900 may be inserted from the steering wheel 700 positioned above the steering part 200 into the upper portion of the steering part 200.

The wire 900 inserted into the steering part 200 may be bent laterally in the steering part 200 to extend laterally through the steering part 200 and the stationary part 100 simultaneously. The wire 900 may extend to the deck part 800 extended from the stationary part 100 as described below. Accordingly, the wire 900 has an effect wherein the same can be extended without being exposed to the outside.

The steering part 200 may have a space indented inwards, and the sliding part 300 in a state in which a part thereof is inserted into the inside of the steering part 200 may be coupled to the steering part 200 slidable to each other.

The sliding part 300 may be slidable in a state where a part of the sliding part 300 is inserted into a space indented into the steering part 200.

In an exemplary embodiment, the sliding part 300 is also formed to have an indented space, and one indented space is in communication with the other so that the internal space can be expanded.

The sealing member 220 fixed to the end of the steering part 200, sealing between an inner circumference surface of the steering part 200 and an outer circumference surface of the sliding part 300 may be further included.

The sealing material 220 may be, for example, a rubber ring, and may seal the interval between the steering part 200 and the sliding part 300 so as to block a fluid flow generated between the sliding surfaces of the steering part 200 and the sliding part 300.

The sealing material 220 is fixed to the lower end of the steering part 200 to be able to maintain the sealing even when the sliding part 300 is relatively moved by the sliding. The outer side of the sealing member 220 may further include a sealing holder 221 to fix the position of the sealing member 220.

The steering part 200 and the sliding part 300 may be integrally coupled to rotate.

Specifically, the insertion protrusion 230 is formed at the end of the steering part 200, and the insertion groove 330 extended along the sliding direction of the sliding part 300 is formed on the outer circumference surface of the sliding part 300 so that the sliding part 300 is sliding in the state where the insertion protrusion 230 is inserted into the insertion groove 330, in order to prevent the relative rotation between the steering part 200 and the sliding part 300.

The insertion protrusion 230 may be formed to protrude inward from the lower end of the steering part 200, and formed to be indented inward from the outer circumference surface of the sliding part 300. A plurality of the insertion protrusions 230 and the insertion grooves 330 may be formed along the circumference direction of the steering part 200 or the sliding part 300.

In the central portion in any one of the steering part 200 and the sliding part 300, by forming a guide shaft 310 protruding toward the internal space, and in the central portion in the other one of the steering part 200 and the sliding part 300, by forming a guide hole 211 protruding toward the internal space and sliding with the guide shaft 310 inserted therein, a hollow shaft 210 may be formed.

Specifically, according to an exemplary embodiment, in the sliding part 300, a guide shaft 310 protruded from the center portion therein and extending to the steering part 200 side may be formed. A hollow shaft 210 protruding from the center portion and extending toward the sliding part 300 may is formed in the steering part 200, and a guide hall 211 in which the guide shaft 310 is inserted to slide therein may is formed in the hollow shaft 210. Accordingly, the sliding part 300 may slide in the steering part 200, and at the same time, the guide shaft 310 may slide in the hollow shaft 210.

Accordingly, the sliding between the sliding part 300 and the steering part 200 has an effect wherein the same is guided so as not to rotate laterally.

A stopper 340 may be further included which prevents sliding between the steering part 200 and the sliding part 300, the stopper being positioned at an end of the hollow shaft 210 or a position corresponding to an end of the guide shaft 310 in the steering part 200, or at the end of the guide shaft 310 or a position corresponding to the end of the hollow shaft 210 in the sliding part 300.

The stopper 340 may be a rubber ring, for example. In order that the steering part 200 and the sliding part 300 do not directly collide, the stopper 340 may be positioned at the end of the hollow shaft 210 or the end of the guide shaft 310, or positioned in the steering part 200 or the sliding part 300 where the hollow shaft 210 and the guide shaft 310 are in contact with each other.

Accordingly, the collision between the steering part 200 and the sliding part 300 is prevented, thereby reducing impact and improving durability.

The flow paths 410 and 420 may include a first flow path 410 allowing a flow of the fluid discharged to the outside from the internal space between the steering part 200 and the sliding part 300; and a second flow path 420 allowing a flow of the fluid from the outside into the internal space between the steering part 200 and the sliding part 300.

The first flow path 410 may allow only the flow that the fluid in the internal space is discharged to the outside, and the second flow path 420 may allow only the flow that the fluid in the internal space is introduced from the outside into the internal space.

Specifically, a check valve (not shown) may be provided in each of the first flow path 410 and the second flow path 420 to allow the fluid to flow in only one direction. Each check valve (not shown) may be arranged in opposite directions to each other.

Accordingly, the fluid has the effect of setting the damping force separately by being moved separately through different flow paths during compression and expansion of the internal space due to sliding between the steering part 200 and the sliding part 300.

Outlets of the flow paths 410 and 420 may be formed to have orifice structures, respectively. An orifice structure may be formed to eject the fluid from the outlets of the first flow path 410 and the second flow path 420. Specifically, the outlet of the first flow path 410 may be formed in a direction in which the fluid is ejected from the internal space to the outside, and the outlet of the second flow path 420 may be formed in a direction in which the fluid is ejected from the outside to the internal space.

The control part 600 coupled to the sliding part 300 to be relatively movable to vary the opening degree of the outlet in the position where the outlet of the flow path (410, 420) is formed may be further included.

The control part 600 may be coupled to the sliding part 300 by screwing, and may be moved relative to the sliding part 300. The control part 600 may control the opening degrees of the first flow path 410 and the second flow path 420 at the position where the outlets of the first flow path 410 and the second flow path 420 are formed.

The control part 600 may simultaneously control the opening degrees of the first flow path 410 and the second flow path 420 at the same time and are separately located at the outlet of the first flow path 410 or the second flow path 420 respectively to control the opening degrees separately.

Accordingly, the damping force of the damper implemented by the internal space can be varied only by controlling the control part 600. In particular, the first flow path 410 and the second flow path 420 are formed separately, the outlet opening can also be formed to have a different damping force at the time of compression and expansion as it is also controllable separately.

In addition, when the fluid is air, the outlets of the first flow path 410 and the second flow path 420 may be connected to the outside, but according to another embodiment, when the fluid is not the air, the outlet of the first flow path 410 and the second flow path 420 may be connected to a reservoir (not shown) in which the fluid is stored therein.

Figure 5:
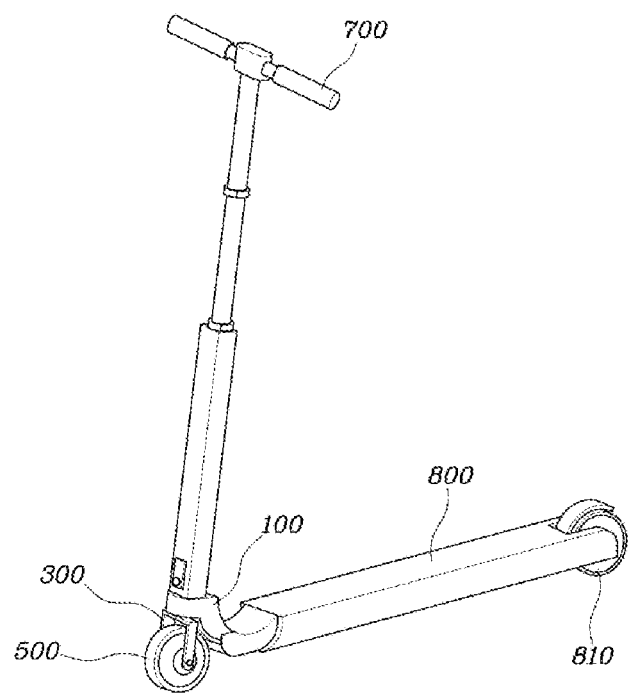
FIG. 5 is a perspective view of a mobility device including the shock absorber structure according to an exemplary embodiment of the present disclosure.

FIG. 5 is a perspective view of a mobility device including the shock absorber structure according to an exemplary embodiment of the present disclosure.

Referring to FIG. 5, the mobility device including the shock absorber structure according to the embodiment of the present disclosure includes a steering wheel 700 penetrating the stationary part 100, and integrally connected to be rotated with the steering part 200; a deck 800 extended from the stationary part 100 or integrally connected to the stationary part 100 and having an area on which a foot of a occupant is mounted; and auxiliary wheel 810 rotatably coupled to the deck part 800.

The steering wheel 700 may be formed at a position spaced upwardly from the steering part 200. The steering wheel 700 and the steering part 200 may be connected to the steering shaft. The steering wheel 700 may be formed extending laterally from the steering shaft.

The deck part 800 may extend in a plane direction parallel to the ground to form an area in which the occupant rides. The stationary part 100 may be located at the front or rear of the deck part 800, and may be integrally coupled to the deck part 800 or the stationary part 100 may be extended to form the deck part 800.

The auxiliary wheel 810 may be rotated on the basis of the deck part 800 by the rotation axis being coupled to the deck part 800. The auxiliary wheel 810 may be a driving wheel driven by a driving source.

Although a preferred embodiment of the present disclosure has been described for illustrative purposes, those skilled in the art will appreciate that various modifications, additions and substitutions are possible, without departing from the technical scope and spirit of the disclosure as disclosed in the accompanying claims.

What is claimed is:

1. A shock absorber structure, comprising:
a stationary part;
a steering part extending in a longitudinal direction and rotatably coupled to the stationary part by a rotation axis in the longitudinal direction;
a sliding part which forms an internal space containing fluid between the steering part and the sliding part and is slidably coupled to the steering part in a direction in which the steering part extends;
an elastic body having both ends that are respectively coupled to the steering part and the sliding part to support the steering part and the sliding part and maintain the internal space between the steering part and the sliding part;
a flow path formed in the sliding part and configured to communicate the internal space between the steering part and the sliding part with an outside so that the fluid can flow;
a steered driving wheel rotatably connected to the sliding part; and
a control part coupled to the sliding part to be relatively movable to vary an opening degree of an outlet of the flow path in a position where the outlet is provided.

2. The shock absorber structure of claim 1, wherein the stationary part surrounds a part of the steering part from the outside, and is coupled to the steering part through a bearing positioned between the steering part and the steering part.

3. The shock absorber structure of claim 1, wherein the steering part penetrate the stationary part, and is integrally connected to a steering wheel so as to rotate with the steering wheel.

4. The shock absorber structure of claim 3, further comprising:
a wire configured to be inserted into an inside of the steering part from the steering wheel and extended to simultaneously penetrate both the stationary part surrounding an outside of the steering part and the steering part.

5. The shock absorber structure of claim 1, wherein the steering part has an inwardly indented space, and the sliding part in a state in which a part of the sliding part is inserted into an inside of the steering part is coupled to the steering part so as to be slidable with each other.

6. The shock absorber structure of claim 5, further comprising:
a sealing member fixed to an end of the steering part so as to seal a gap between an inner circumference surface of the steering part and an outer circumference surface of the sliding part.

7. The shock absorber structure of claim 1, wherein an insertion protrusion is provided at an end of the steering part, and an insertion groove extending along a sliding direction of the sliding part is provided on an outer circumference surface of the sliding part so that the sliding part slides in a state where the insertion protrusion is inserted into the insertion groove, in order to prevent a relative rotation between the steering part and the sliding part.

8. The shock absorber structure of claim 1, wherein a hollow shaft is provided by forming a guide shaft protruding toward the internal space in a central portion in one of the steering part and the sliding part, and by forming a guide hole protruding toward the internal space and sliding with the guide shaft inserted thereinto in the central portion in a remaining one of the steering part and the sliding part.

9. The shock absorber structure of claim 8, further comprising:
a stopper preventing sliding between the steering part and the sliding part, the stopper being positioned at an end of the hollow shaft or a position corresponding to an end of the guide shaft in the steering part, or at the end of the guide shaft or a position corresponding to the end of the hollow shaft in the sliding part.

10. The shock absorber structure of claim 1, wherein the flow path includes:
a first flow path allowing a flow of the fluid discharged to the outside from the internal space between the steering part and the sliding part; and
a second flow path allowing a flow of the fluid from the outside into the internal space between the steering part and the sliding part.

11. The shock absorber structure of claim 1, wherein a check valve is provided in the flow path to allow the fluid to flow in only one direction.

12. The shock absorber structure of claim 1, wherein an outlet of the flow path is configured to have an orifice structure.

13. A mobility device, comprising:
a shock absorber structure, comprising:
a stationary part;
a steering part extending in a longitudinal direction and rotatably coupled to the stationary part by a rotation axis in the longitudinal direction;
a sliding part which forms an internal space containing fluid between the steering part and the sliding part and is slidably coupled to the steering part in a direction in which the steering part extends;

an elastic body having both ends that are respectively coupled to the steering part and the sliding part to support the steering part and the sliding part and maintain the internal space between the steering part and the sliding part;

a flow path formed in the sliding part and configured to communicate the internal space between the steering part and the sliding part with an outside so that the fluid can flow;

a steered driving wheel rotatably connected to the sliding part;

a control part coupled to the sliding part to be relatively movable to vary an opening degree of an outlet of the flow path in a position where the outlet is provided;

the mobility device further comprising:

wherein the steering part penetrate the stationary part, and is integrally connected to a steering wheel so as to rotate with the steering wheel;

a steering wheel penetrating the stationary part, and integrally connected to the steering part so as to rotate with the steering part;

a deck extending from the stationary part or integrally connected to the stationary part and having an area on which feet of an occupant are placed; and an auxiliary wheel rotatably coupled to the deck part.

* * * * *